(12) United States Patent
Fear

(10) Patent No.: US 12,121,801 B2
(45) Date of Patent: Oct. 22, 2024

(54) TRANSFERRING FROM A CLOUD-HOSTED INSTANCE OF AN APPLICATION TO A LOCAL INSTANCE

(71) Applicant: NVIDIA Corporation, Santa Clara, CA (US)

(72) Inventor: Andrew Fear, Cedar Park, TX (US)

(73) Assignee: NVIDIA Corporation, Santa Clara, CA (US)

( * ) Notice: Subject to any disclaimer, the term of this patent is extended or adjusted under 35 U.S.C. 154(b) by 547 days.

(21) Appl. No.: 16/989,446

(22) Filed: Aug. 10, 2020

(65) Prior Publication Data
US 2022/0040573 A1  Feb. 10, 2022

(51) Int. Cl.
*A63F 13/355* (2014.01)
*A63F 13/358* (2014.01)

(52) U.S. Cl.
CPC .......... *A63F 13/355* (2014.09); *A63F 13/358* (2014.09); *A63F 2300/552* (2013.01)

(58) Field of Classification Search
CPC .................. A63F 13/355; A63F 13/358; A63F 2300/552; H04L 65/1069; G06F 11/1451; G06F 11/1464
See application file for complete search history.

(56) References Cited

U.S. PATENT DOCUMENTS

| | | | |
|---|---|---|---|
| 10,673,958 B1 * | 6/2020 | Wylie | H04L 67/148 |
| 10,814,227 B2 | 10/2020 | Colenbrander | |
| 11,005,935 B1 * | 5/2021 | Littlefield | G06F 11/1464 |
| 11,260,295 B2 * | 3/2022 | Mueller | A63F 13/355 |
| 11,405,053 B2 * | 8/2022 | Parker | G06F 9/466 |
| 2012/0278439 A1 * | 11/2012 | Ahiska | A63F 13/77 709/218 |
| 2015/0126282 A1 * | 5/2015 | Hitomi | A63F 13/355 463/42 |
| 2015/0180963 A1 * | 6/2015 | Luecke | H04L 67/10 709/203 |
| 2015/0200974 A1 * | 7/2015 | Pearce | H04L 65/1069 709/203 |
| 2015/0200983 A1 * | 7/2015 | Pearce | H04L 65/403 709/205 |
| 2017/0050111 A1 * | 2/2017 | Perry | H04L 67/131 |
| 2017/0216720 A1 * | 8/2017 | Colenbrander | A63F 13/493 |
| 2021/0129019 A1 * | 5/2021 | Colenbrander | A63F 13/355 |
| 2021/0260470 A1 * | 8/2021 | Maitlen | A63F 13/22 |

\* cited by examiner

*Primary Examiner* — William H McCulloch, Jr.
*Assistant Examiner* — Ankit B Doshi
(74) *Attorney, Agent, or Firm* — Taylor English Duma L.L.P.

(57) ABSTRACT

In various examples, a user may access or acquire an application to download to the user's local computing device. Upon accessing the application, a local instance of the application may begin downloading to the computing device, and the user may be given the option to play a cloud-hosted instance of the application. If the user selects to play a hosted instance of the application, the cloud-hosted instance of the application may begin streaming while the local instance of the application downloads to the user's computing device in the background. Application state data may be stored and associated with the user during gameplay such that, once the local instance of the application has downloaded, the user may switch from the hosted instance of the application to the local instance to begin playing locally, with the application state information accounted for.

20 Claims, 10 Drawing Sheets

TRANSFERRING FROM A CLOUD-HOSTED INSTANCE OF AN APPLICATION TO A LOCAL INSTANCE

BACKGROUND

Users who acquire and/or access a video game from an online distribution platform are often forced to wait for the video game to download to their device before the user can begin playing the video game. However, the file sizes for many modern video games are often quite large and, depending on the characteristics of a user's home network, may take hours to download prior to being available for gameplay. As an alternative, instead of acquiring and hosting a game locally on their device, users may instead subscribe to an online game streaming platform to play games. However, due to bandwidth restrictions, the underlying hardware used to generate the game stream, and/or other network infrastructure or hardware characteristics, streaming from servers in the cloud may not provide users with the same levels of fidelity and latency afforded by playing a downloaded version of a video game on a user's gaming device, thus resulting in a lower quality gaming experience. As such, for users with devices that are capable of hosting high performance gameplay locally, these users are forced to either wait for games to download prior to playing locally, or are forced to potentially sacrifice game quality and stream from the cloud.

To account for this, some traditional systems may provide users with the ability to begin playing a video game after the video game has been partially downloaded. For example, a video game download that is 100 gigabytes (GB) might be playable, in a limited form (e.g., a few levels or a few gaming modes), after 30 GB of the video game has been downloaded. After the limited portion of the video game is downloaded, the remaining files may download in the background, sometimes while the game is being played. While this system may allow a user to play the video game before the entire video game is downloaded, the user is still required to wait until the video game download reaches a minimum threshold, which may still take a substantial amount of time. Moreover, until the full download is completed, gameplay may be restricted to only the already downloaded portion. For example, a user may be able to start playing a video game after levels one through three are downloaded. However, if the user moves through these three levels before the next level has finished downloading, the user will be forced to wait for the remaining levels to download before continuing to play.

SUMMARY

Embodiments of the present disclosure relate to initially hosting a game or application in a cloud streaming environment during local download of the game, and then transferring the cloud game or application to a local instance of the game or application once the download completes. For example, game state information may be generated and stored during gameplay of a cloud gaming version or instance of the game, and then the game state information may be used by a user device—once local download of the game has completed—to transfer to a local version or instance of the game. In this way, a user may begin gameplay of a cloud version of the game immediately after purchase or access, and a substantially seamless transition from the cloud game to a local instance of the game may be executed without requiring the user to replay already completed portions of the game. Once the transition is completed, a user may take advantage of the capabilities of their local device executing the local instance of the game.

As such, and in contrast to conventional systems, such as those described above, the present system transfers game state information from a cloud or other game server-hosted instance of a video game to a local instance of the video game once the data (e.g., executable) files of the video game have been downloaded to a local device and the game application is available (e.g., executing locally). In some examples, a user may visit an online game store to purchase or access a video game. Upon purchasing or accessing the video game, data files of the video game may begin downloading to the user's local gaming device and the user may choose to play the video game via a cloud hosted version of the video game while the download is taking place. In this way, a cloud instance of the video game may begin streaming from game servers in the cloud, and game state information may be gathered, stored, and/or transferred to the user's device for updating the local instance. Once the files of the video game have completed downloading on the local machine, the user may be prompted to switch to the local instance of the video game to begin playing a local instance of the video game hosted by the user's device. Once the user selects to switch to the local instance of the video game, a local instance of the video game may be executed on the user's device and the stored game state information of the cloud hosted version of the video game may be used to load the local version in view of the user's settings and already completed gameplay. As a result, the user may begin playing the local instance of the video game at the same—or substantially the same—point in the game where the user left off in the cloud hosted instance of the video game.

BRIEF DESCRIPTION OF THE DRAWINGS

The present systems and methods for transferring a cloud game to local game are described in detail below with reference to the attached drawing figures, wherein.

DETAILED DESCRIPTION

Figure 1:
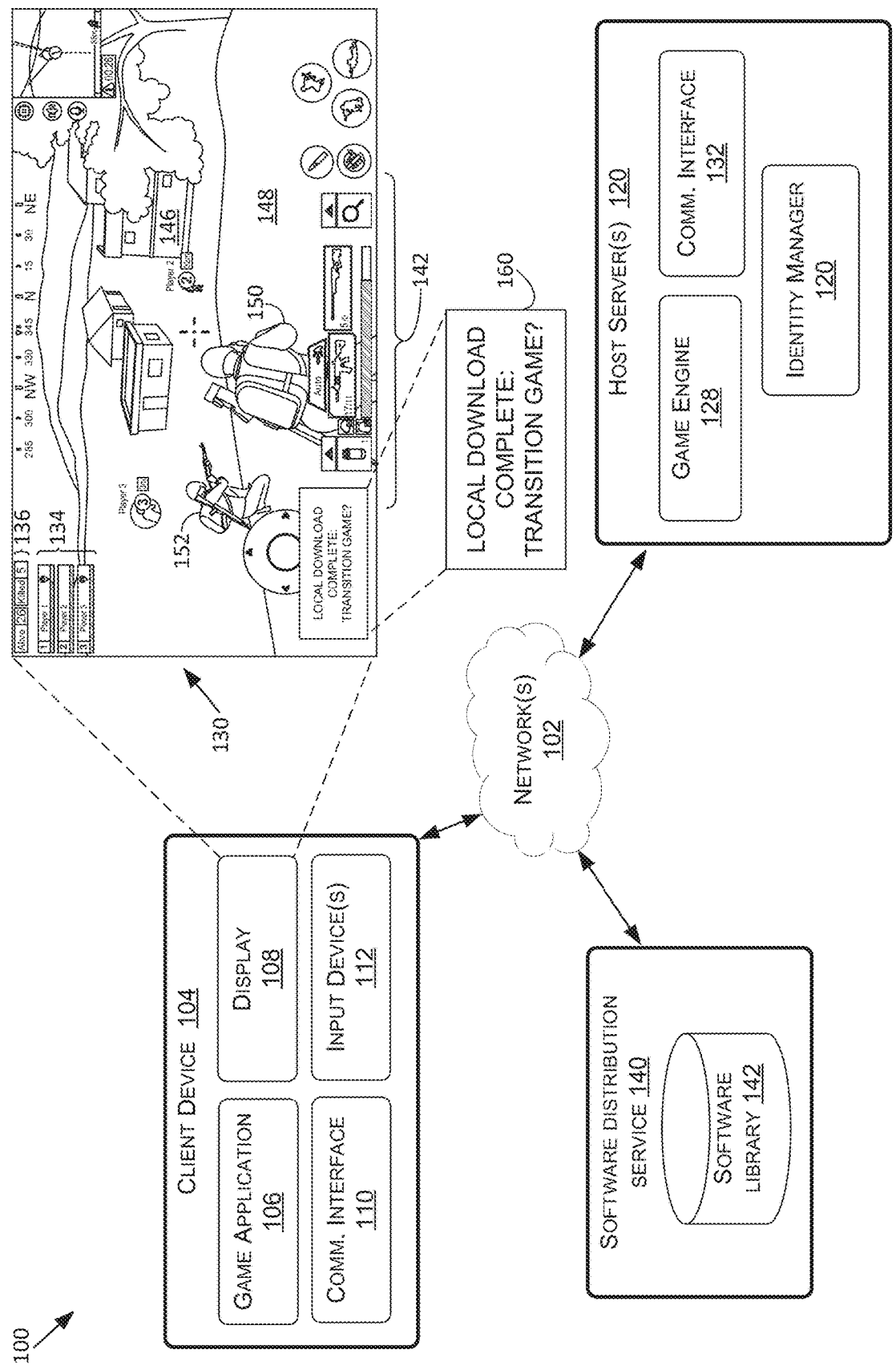
FIG. 1 is an example system diagram of a game state transfer system, in accordance with some embodiments of the present disclosure.

Systems and methods are disclosed related to transferring a cloud game to a local game. Although primarily described herein with respect to gaming implementations, this is not intended to be limiting, and the systems and methods of the present disclosure may be implemented in any implementation for transferring application state information between a cloud hosted version and a locally hosted version. For non-limiting examples, the systems and methods described herein may be implemented for simulation applications, virtual reality (VR) and/or augmented reality (AR) applications, modeling applications, content editing applications, deep learning applications, or other applications which may be hosted on cloud servers or downloaded to a local device.

In some embodiments, a user may visit an online video game digital distribution service to purchase or access a video game to download to the user's local gaming platform or device (e.g., a computer, a tablet, a game console, etc.). Upon purchasing or otherwise being granted access to the video game, data files of the video game may begin downloading from a virtual software library of the online video game digital distribution service to the user's local gaming platform. Further, the user may be prompted or given the option to play a hosted instance of the video game via remote servers (e.g., a cloud server) configured to stream an instance of the game directly to the user's display device or gaming platform. If the user selects to play a hosted instance of the video game via remote servers, a cloud instance of the video game may begin streaming from game servers in the cloud (e.g., via one or more application programming interfaces (APIs)) while data files of the video game are downloaded to the user's gaming platform in the background. While the user plays the cloud streaming version of the video game, game state data may be tracked, stored, and/or associated with an account of the user —e.g., using an identity management (IDM) system.

In some embodiments, the game state information may include—without limitation—digitally stored information about game settings, player or avatar customizations, progress and achievements in the game, state information (e.g., inventory, health, game physics, avatar locations, etc.) of a current game session (e.g., a current sports game, a current capture the flag game, etc.), etc. As such, the game state information may include global game state information and/or instance game state information. This information may be stored in the cloud at a game server, developer server and/or other cloud location, and/or may be transmitted to a local device of the user to configure the local instance of the game to launch where the user left off in the cloud instance. For example, game state information for a user streaming a video game via GeForce NOW can be stored on GeForce NOW servers, may be stored on servers associated with the online video game distribution service, and/or may be stored on IDM servers.

As non-limiting examples, global game state information may include game state information relating to a persistent configuration of a video game that can span more than one discrete gaming session. Global game state information may include configurable game attributes and general game progress. Configurable game attributes may include a user avatar, social media information, game control preferences, and/or any other setting made available to the user. General game progress may include a user's advancement through levels, maps, areas, stages, worlds, tracks, boards, floors, zones, phases, missions, episodes, courses, etc. in a video game. General game progress may also include a user's in-game achievements such as weapons, upgrades, trophies, points, badges, awards, stamps, medals, challenges, or other in game milestones or progress markers included by the game developer. For example, global game state information may include customizations to a player avatar or character, achievements, weapons acquired, points, levels completed, etc.

Instance game state information may correspond to game state information relating to a current or real-time condition or state of a session of gameplay of a video game. For example, these save conditions of a session of gameplay may include, for example, a user's position in a map of a video game, a game clock (e.g., gameplay duration, countdown, etc.), changes to a default state of a map or objects in the map of a video game, acquired/depleted objects (e.g., weapons, ammunition, power-ups, etc.), avatar health of the user's avatar and other avatars, or other changes (e.g., changes to the world state, such as destroyed or damaged building or objects, acquired items, etc.) that may accumulate during a gameplay session.

Once a local instance of the video game has completed downloading, the user may be prompted to switch from the hosted instance of the video game to the local instance of the video game to begin playing a locally hosted instance of the video game. In some examples, the user may be prompted to switch to the local instance after a portion (e.g., essential files, beginning levels, popular game modes, etc.) of the video game has been downloaded. If the user selects to switch to the local instance of the video game, the locally downloaded game application may be launched and a local instance of the video game may be executed on the user's local gaming platform. In addition, the stored game state information from the cloud hosted instance of the video game may be received by the local device and used to launch the local instance of the game at a state determined from the game state information. The game state information, or a substantial portion thereof, may be downloaded at a substantially similar time as the other data files of the video game. For example, global game state information (e.g., advancements and achievements) may be downloaded at the same time as the data files of the video game and instance game state information, which may be a smaller file size, may download once the user selects to switch to the local instance of the video game. As such, the indication that the game is available for launch on a local device may be based on not only the game data being downloaded, but also the game state information corresponding to the cloud hosted version of the game being downloaded. As a result, the user may begin playing the local instance of the video game at the same point in the game where the user left off in the hosted instance of the video game, with both global and instance game state information being accounted for.

In some embodiments, once the local instance of the game has been launched, game state information of the local version may be tracked and stored locally on the user's device and/or in the cloud using one or more servers—such as the IDM servers. In this way, when a user switches from the locally hosted instance of the game back to a cloud hosted instance of the game (e.g., on the user's device storing the local instance and/or on another device of a user—such as a device with less capabilities), the game state information may be used to enable a seamless handoff back to a cloud-hosted instance of the game.

With reference to FIG. 1, FIG. 1 is an example system diagram of a game state transfer system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software, or any combination thereof. For instance, various functions may be carried out by a processor executing instructions stored in memory. The game state transfer system 100 (and the components, features, and/or functionality thereof) may be implemented using one or more computing devices, such as example computing device 500 of FIG. 5, described in more detail below. In addition, in some embodiments, during cloud hosted gameplay, the state transfer system 100 may execute the cloud hosted game using components, features, and/or functionality similar to that of example game streaming system 400 of FIG. 4.

The game state transfer system 100 may include, among other things, client device 104, one or more host servers 120, and/or a software distribution service 140. Components of the game state transfer system 100 may communicate over network(s) 102. The network(s) may include a wide area network (WAN) (e.g., the Internet, a public switched telephone network (PSTN), a cellular network, etc.), a local area network (LAN) (e.g., Wi-Fi, Bluetooth, Bluetooth Low Energy (BLE), Ethernet, etc.), and/or another network type, such as those described herein. In any example, each of the components of the game state transfer system 100 may communicate with one or more of the other components via one or more of the network(s) 102.

As illustrated in FIG. 1, the host server(s) 120 may be separate or distinct from the software distribution service 140; however, this is not intended to be limiting. In some examples, the host server(s) 120 may be the same or similar servers to the software distribution service 140. In some examples, the host server(s) 120 may be operated or hosted by a first entity (e.g., a first company) and the software distribution service 140 may be operated or hosted by a second entity (e.g., a second, different company). In other examples, the host server(s) 120 and the software distribution service 140 may be operated and/or hosted by the same entity.

The host server(s) 120 may include one or more application programming interfaces (APIs) to enable communication of information (e.g., user profiles, game state data, etc.) with the client device 104. The host server(s) 120 may include a game engine 128, a communication interface 132, and an identity manager 120. In some embodiments, such as where the host server(s) 120 include an identity manager, the host server(s) 120 may correspond to an identity management (IDM) system. Although illustrated as a component of the host server(s) 120, this is not intended to be limiting. In some embodiments, the identity manager 120 may be hosted by a different server, such as an IDM server (not shown). For example, identity management information corresponding to a particular game application may be managed by a game developer of the game application. In such examples, the identity manager 120 may be hosted by one or more servers or other computing devices of the game developer.

The game engine 128 may include the functionality of a game that enables a game to be played by one or more users over a network. The game engine 128 may include a rendering engine, an audio engine, a physics engine, an animation engine, an artificial intelligence engine, a networking engine, a streaming engine, a memory management engine, and/or other components or features. The game engine 128 may be used to generate some or all of the game state data while a user plays a cloud hosted instance of a game via host server(s) 120. In some embodiments, the game engine 128 may correspond to host application for executing cloud hosted versions or copies of game applications. For example, the game engine 128 may host a cloud-hosted instance of the game application while game application 106 downloads to the client device 104. The game engine 128 may support an API for executing the cloud-hosted instance of the game for the client device 104.

The identity manager 120 may manage and store game state information for a user including, but not limited to, digitally stored information about game settings, player or avatar customizations, progress and achievements in the game, state information (e.g., inventory, health, game physics, avatar locations, etc.) of a current game session (e.g., a current sports game, a current capture the flag game, etc.), etc.. For example, as a user advances through levels in the game application 106 while playing via host server(s) 120, the user's progress in the game may be stored in association with the user's identity (e.g., username, gamer tag, etc.) in the identity manager 120. Further, the user's real-time condition in the instance of gameplay may be stored. For example, the user's position in a map of the game, a game clock, destruction to aspects of the map of the game, acquired weapons, avatar health of the user's avatar and other avatars may all be stored in association with the user's identity in the identity manager 120. In some embodiments, once a user transitions to a local instance of the game application 106 executing on the client device 104, the identity manager 120 may continue to store game state or other game related information such that the user can transition back to a cloud-hosted instance of the game at another time (e.g., via the client device 104 or another client device, such as a client device with less computing power or capability).

The communication interface 132 may include one or more components and features for communicating across one or more networks, such as the network(s) 102. The communication interface 132 may be configured to communicate via any number of network(s) 102, described herein. For example, to communicate in the game state transfer system 100 of FIG. 1, the host server(s) 120 may communicate over a LAN with other host server(s) 120 and/or over the Internet with the software distribution service 140 and/or the client device(s) 104.

The software distribution service 140 may manage the license (e.g., purchase, rental, lease, and/or loan) of video games or other software applications to a user. The software distribution service 140 may include a digital storefront or platform through which users may acquire a license to video games. The software distribution service 140 may also provide digital rights management (DRM) systems, limiting the use of software to one license per user account, for example.

The software distribution service 140 may further include a software library 142 that stores data files of software and provides access to these files. For example, a user may access the software library 142 via a digital storefront, which may include a catalog of available games or applications the user may purchase or access. The user may browse and/or search the catalog (e.g., via an API) and select a game or application they would like to purchase or access. Upon selection of a game, the user may purchase, lease, rent, or otherwise access the game via the digital storefront of the software distribution service 140 and the game or application may begin downloading to the client device 104 from the software library 142.

The client devices 104 may include a smart phone, a laptop computer, a tablet computer, a desktop computer, a wearable device, a game console, a virtual reality (VR) or augmented reality (AR) system (e.g., a headset, a computer, a game console, remote(s), controller(s), and/or other components), a content streaming device (e.g., NVIDIA SHIELD), a smart-home device that may include an intelligent personal assistant, and/or another type of device capable of supporting game play.

The client devices 104 may include a game application 106, a display 108, a communication interface 110, and/or an input device(s) 112. Although only a few components and/or features of the client device 104 are illustrated in FIG. 1, this is not intended to be limiting. For example, the client devices 104 may include additional or alternative components, such as those described below with respect to the computing device 500 of FIG. 5.

The game application 106 may be a mobile application, a computer application, a console application, and/or another type of application. The game application 106 may include instructions that, when executed by a processor(s), cause the processor(s) to, without limitation, receive input data representative of user inputs to the one or more input device(s) 112, store game state data to the host server(s) 120 and/or the servers on the software distribution service 140 and/or the client device 104, retrieve game data from memory or local storage, receive the game data using the communication interface 110 from the host server(s) 120 and/or the servers on the software distribution service 140 and/or the client device 104, and cause display of the game on the display 108. In other words, the game application 106 may operate as a facilitator for enabling playing of a game associated with the game application on the client devices 104.

The game application 106 may be purchased by a user from a software library 142 of the software distribution service 140. In some examples, however, the game may be purchased in physical form (e.g., a Blu-Ray, memory card, game disc, a game cartridge, etc.), and the processed described herein may be executed (e.g., a cloud game may be executed) while the data from the physical instance is installed and any other updates are downloaded to the client device 104. In any example, upon purchasing the game application 106, data files of the game application 106 may begin downloading to the client device 104. After or before the game application 106 begins downloading to the client device 104, the user may choose to play a cloud or server hosted instance of the game application 106 via game engine 128 on the host server(s) 120. For example, upon beginning a download of a purchased video game, a graphic may appear on the user's display asking whether the user would like to play the game via the cloud. If the user selects that they would like to play via the cloud, the user may start streaming the video game from cloud servers (e.g., host server(s) 120, software distribution service 140, or other servers). For example, upon receiving a request to play via the cloud, gaming engine 128 on the host server(s) 120 may instantiate a hosted instance of the game application 106 from the software library 142 of the software distribution service 140 (e.g., via one or more application programming interfaces (APIs)) over network(s) 102), or may launch an instance of an of the game application from the host servers 120. The gaming engine 128 may then instantiate a cloud-hosted instance of the game application 106 and begin streaming from the host server(s) 120 to the client device 104.

Game state information may be stored while a user is playing a cloud-hosted instance of game application 106. By way of example, game state information may be stored for a game session 130 displayed via display 108. With reference to game session 130 (e.g., a first person shooter (FPS) type game), the game state information may include information about players in the game (e.g., Player 1, Player 2, and Player 3 indicated by the player region 134 of the game session 130, how many and which of the players are alive or dead at any given time, as indicated by region 136 of the game session 130, etc.), the location of player 150 (indicated by a corresponding character in FIG. 1) and player 152 (indicated by a corresponding character in FIG. 1) as the players (e.g., characters controlled thereby) move about the environment, the stance of player 150 and player 152 (e.g., crouched as illustrated in FIG. 1), statistics or player attributes of the players (e.g., strength, speed, stamina, damage, etc.), etc. The game state information may further include how many players or characters are alive or dead (e.g., as represented in the region 138), each of the players that are in the game (e.g., each of the players in the player listing 140), the health of each of the players (e.g., player status), the weapons and/or items each of the players is carrying (e.g., as indicated by the status region 142 of the game session 130), etc. The game state data may further include a state of objects (e.g., environmental objects), such as the rock 148, the building 146 (and/or the other buildings), trees, etc.

In addition to game instance specific information, global information may also be stored. For example, when the user first accesses the cloud version of the game application, the user may progress through various menus, such as game settings menus, profile creation menus, avatar design or creation menus, game preferences menus, weapon, item, or other loadout specific menus, and/or other menus. As such, this information selected or curated by the user may be stored by the identity manager 120. Further, as the player more generally proceeds through the game, completion of levels, acquired accolades, medals, achievements, and/or other information associated with progression through the game may be stored as the game state data. In some examples, the settings selected by the user may include game settings such as hotkeys, shortcuts, add-ons or toggleable options or features (e.g., push-to-talk). In further examples, the user may select device settings in addition to or alternatively from the game settings, such as a brightness level for the display 108, a resolution for the display 108, sound settings for the client device 104 (e.g., surround sound, stereo, loud, soft, filter out loud noises, etc.), and/or other device specific settings. These game and device settings may be stored along with the game state data such that, when the local instance of the game application 106 is executed on the client device 104, the settings are also applied.

Once a local instance of the game application 106 has completed downloading to client device 104, a user may be prompted via display 108 to switch from the instance of the game application 106 on the host servers(s) 120 to the local instance of the game application 106 on the client device 104 to begin playing a locally hosted version of the game application 106. As described herein, the user may be prompted to switch to the local instance after a portion (e.g., essential files, beginning levels, popular game modes, etc.) of the game application 106 has been downloaded. If the user selects to switch to the local instance of the game application 106, the locally downloaded game application 106 may be launched and a local instance of the game application 106 may be executed on the client device 104. In addition, global game state information and instance game state information stored in the identity manager 120 that was generated from the user's gameplay of hosted instance of the game application 106 may be received by the client device 104 and used to launch the local instance of the game application 106 at a state determined from the game state information. For example, if a user has adjusted game settings, customized their avatar, and unlocked an advanced item while playing the game via host server(s) 120, when the local instance launches, it will launch on the client device 104 with the same adjusted game settings, customized avatar, and advanced item available. By way of further example, if a user is playing an instance of a massively multiplayer online game and has eliminated five other players in the game, used half of their ammunition and moved to the center of the map, when the local instance launches, it will launch on the client device 104 with the same number of eliminated opponents, same amount of ammunition, and in the same location on the map.

The game state information, or a substantial portion thereof, may be downloaded from the identity manager 120 at a substantially similar time as the local instance of the game application 106. For example, global game state information (e.g., advancements and achievements) may be downloaded at the same time as the local instance of the game application 106 and instance game state information, which may be a smaller file size, may download once the user selects to switch to the local instance of the video game on client device 104. As such, an indication to the user that the local version of the game application 106 is available for launch on the client device 104 may be based on not only the game state information being downloaded, but also the game state information corresponding to the cloud hosted version of the game being downloaded from the identity manager 120 to the client device 104. Advantageously, the user may begin playing the local instance of the game application 106 on the client device 104 at the same point in the game where the user left off in the hosted instance of the game application 106 on the host server(s) 120, with both global and instance game state information accounted for.

In some embodiments, once the local instance of the game has been launched on client device 104, game state information of the local version may be tracked and stored locally on the client device 104 and/or in the identity manager 120 using one or more host server(s) 120—such as IDM servers. Advantageously, a user may switch from the locally hosted instance of the game application 106 running on the client device 104 back to a cloud hosted version of the game application 106 running on host server(s) 120. In such examples, the game state information may be used to provide a seamless handoff from the client device 104 back to the game engine 128 to initiate a cloud-hosted instance of the game. For example, a user may be playing an instance of a game on their desktop computer and wish to continue playing on their mobile phone. The user may launch a mobile instance of the game application 106 on their mobile device and begin streaming a cloud-hosted instance of the game over network(s) 102 from host server(s) 120, with both global and instance game state information accounted for. In other words, the user may begin playing on their mobile device where they left off on their computer.

The game application 106 and/or patches or updates to the game application 106 may be downloaded from the software distribution service 140 or may be downloaded from another server(s), such as a server of a content delivery network (CDN). For example, the software distribution service 140 may be located in a different country or on a different continent, so to reduce the download time, the game application 106 and/or the patches or updates may be stored on different servers around the globe. As such, when the client devices 104 are downloading the game application 106 and/or the patches or updates, the client devices 104 may connect to a more local server that is part of the CDN, for example.

In some examples, such as where a local instance is being executed, the client devices 104 may render the game using the game application 106 and hardware and/or software of the client device 104. In other examples, such as where the cloud-hosted instance of the game is being executed, the client device 104 may receive display data (e.g., encoded display data, as described with respect to FIG. 4) and use the display data to display the game on the display 108. In examples where the display data is received by the client device (e.g., where the client device 104 does not generate the rendering), the game state transfer system 100 may be part of a game streaming system, such as the game streaming system 4 of FIG. 4, described in more detail below.

The display 108 may include any type of display capable of displaying the game (e.g., a light-emitting diode display (LED), an organic LED display (OLED), a liquid crystal display (LCD), an active matrix OLED display (AMOLED), a quantum dot display (QDD), a plasma display, an LED/LCD display, and/or another type of display). In some examples, the display 108 may include more than one display (e.g., a dual-monitor display for computer gaming, a first display for configuring a game and a virtual reality display for playing the game, etc.). In some examples, the display is a touch-screen display, such as a touch-screen of a smart phone, tablet computer, laptop computer, or the like, where the touch-screen is at least one of the input device(s) 112 of the client device 104.

The input device(s) 112 may include any type of devices that are capable of providing user inputs to the game. The input device(s) may include a keyboard, a mouse, a touch-screen display, a controller(s), a remote(s), a headset (e.g., sensors of a virtual reality headset, or head mounted display (HMD)), a microphone, and/or other types of input devices.

The communication interface 110 may include one or more components and features for communicating across one or more networks, such as the network(s) 102. The communication interface 110 may be configured to communicate via any number of network(s) 102, described herein. For example, to communicate in the game state transfer system 100 of FIG. 1, the client devices 104 may use a cellular, Ethernet, or Wi-Fi connection through a router to access the Internet in order to communicate with the host server(s) 120 and/or the software distribution service 140.

Figure 2A:
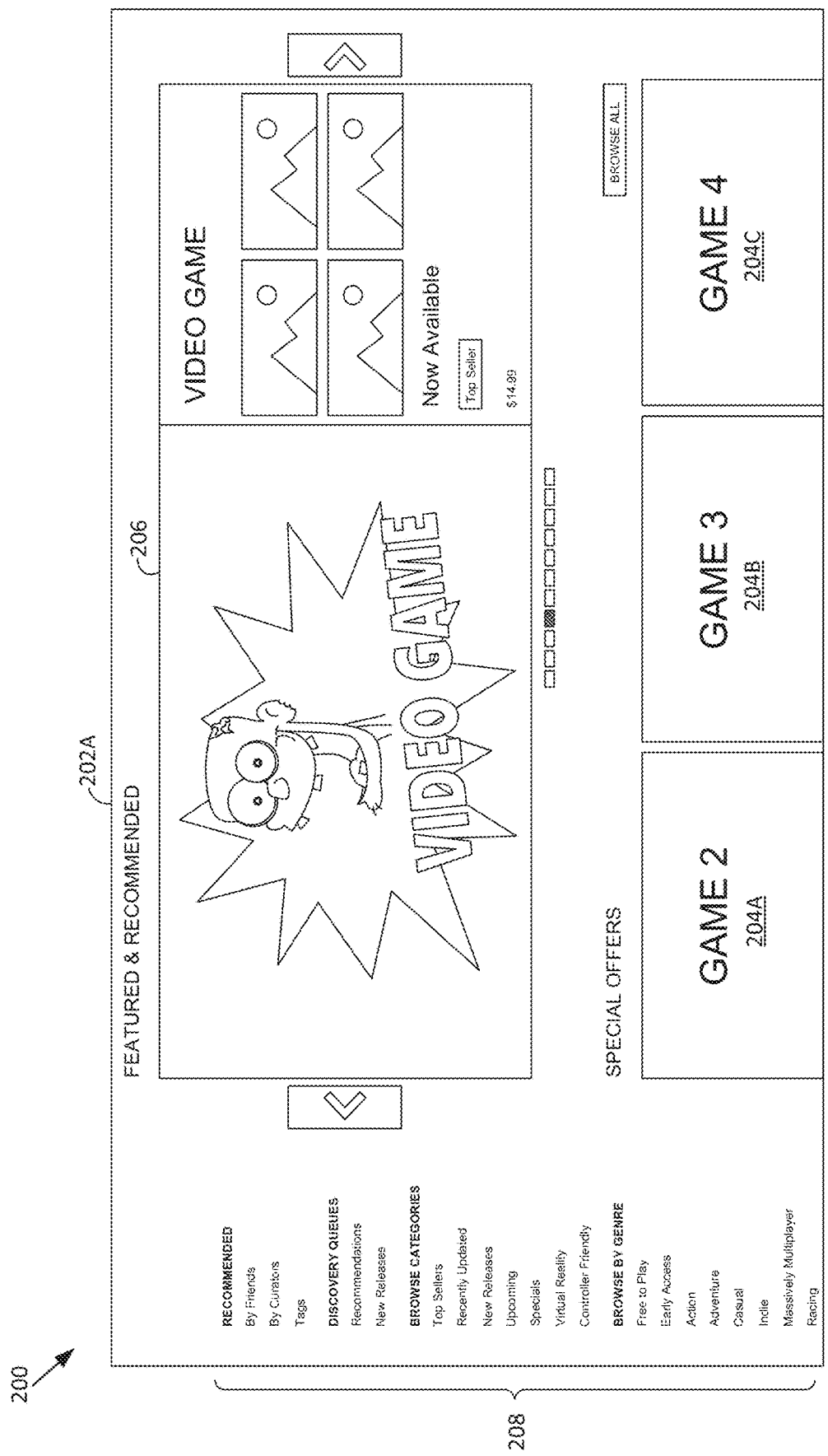
FIG. 2A is an example user interface for a software distribution service, in accordance with some embodiments of the present disclosure.

Now referring to FIG. 2A, FIG. 2A is an example user interface for a software distribution service, in accordance with some embodiments of the present disclosure. The example user interface 200 includes a game store viewing pane 202A, available games 204A, 204B, and 204C, a featured game 206, and set of categories 208.

In operation, a user may interact with the user interface 200 to browse for a game the user would like to purchase. The user may sort through various game titles by selecting a gaming category of the set of categories 208. For example a user may wish to see the top selling games or new releases. The software distribution service may also recommend games via the user interface 200. For example, the user interface 200 may present the user with a featured game 206 that might be displayed prominently in the game store viewing pane 202A in order to draw the user's attention to the featured game 206. Additionally or alternatively, the user interface 200 may display special offers for certain games in the viewing pane 202A. In any example, the user may select one of the games visible in the viewing pane 202A to see additional details about the game and to compete a purchase of the game.

Figure 2B:
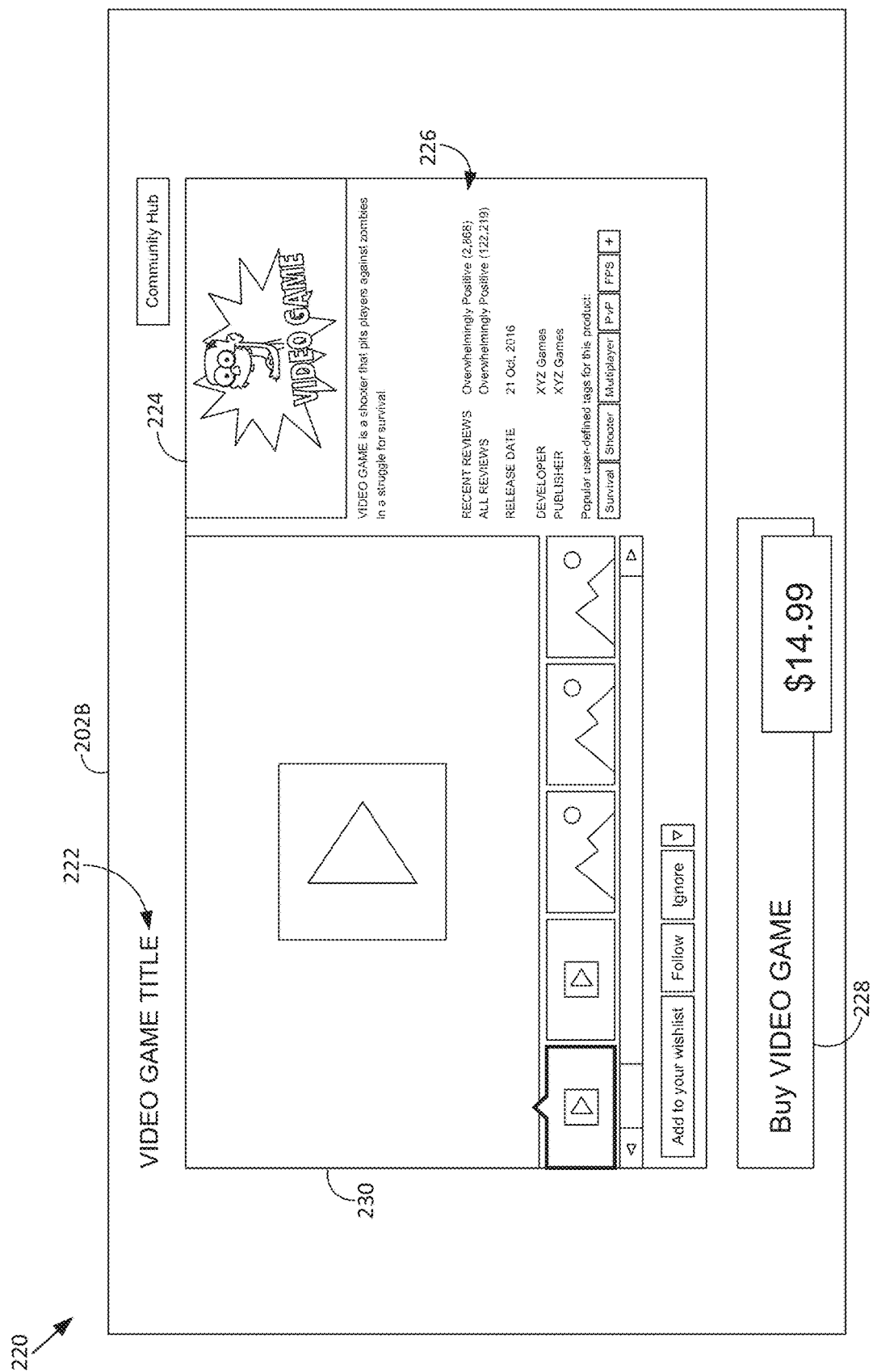
FIG. 2B is an example user interface for purchasing a game, in accordance with some embodiments of the present disclosure.

Now referring to FIG. 2B, FIG. 2B is an example user interface 220 for purchasing a game, in accordance with some embodiments of the present disclosure. The example user interface for purchasing a game includes a viewing pane 202B, a game title 222, game title graphic 224, game details 226, a button 228 for purchasing the game corresponding to the game title 222, and preview graphic 230.

In operation, a user who selects the game title 222 in the user interface 200 of FIG. 2A may be presented with the user interface for purchasing, acquiring, or otherwise accessing a game 220 that corresponds to the game title 222. In the user interface for accessing a game 220, the user may view the game title graphic 224 for the game title 222. For example, a user may be unfamiliar with the game title 222, but may be familiar with the game title graphic and may be able to confirm that the game title 222 is a game the user wishes to access based on viewing the game title graphic 224. Further, the user may read additional details 226 about the game title prior to making a purchase or acquisition (e.g., download). For example, a user may prefer games or versions of a game series that are developed by a particular game developer over another. The user may also preview graphics 230 for the game title 222. For example, a user may be able to view an animated trailer of the video game, watch a review of the game, view gameplay screenshots or other images related to the game title 222. In any example, the user may actuate graphical button 228 to purchase a license of the game corresponding to the game title 222. The user may be directed to a payment screen where the user may enter payment details or to a login screen where the user may confirm a password in order to complete the purchase or some other method of completing the payment for access to the game.

Figure 2C:
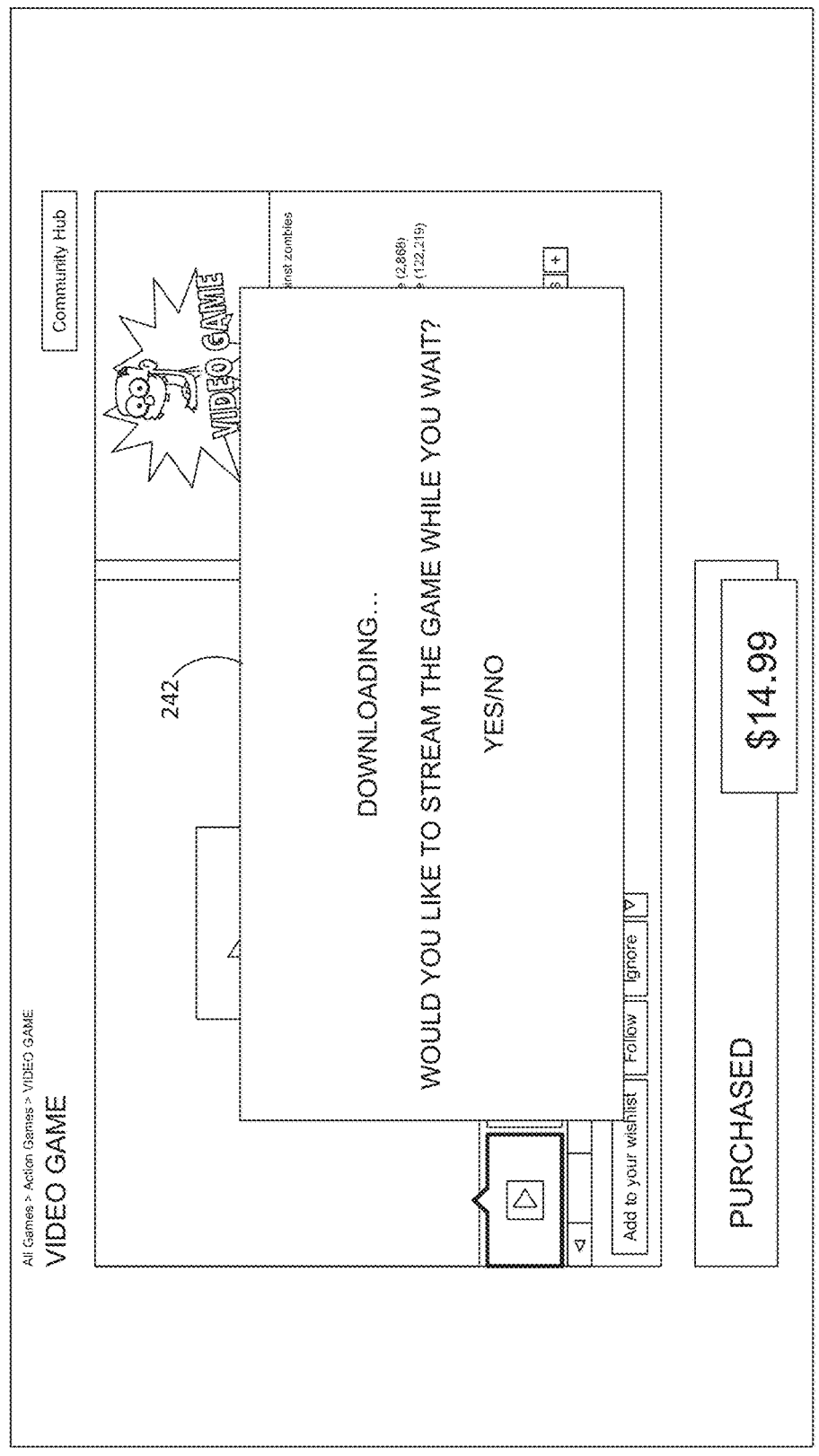
FIG. 2C is an example user interface prompting a user to play a cloud instance of a game, in accordance with some embodiments of the present disclosure.

Now referring to FIG. 2C, FIG. 2C is an example user interface 240 prompting a user to play a cloud-hosted instance of a game, in accordance with some embodiments of the present disclosure. The example user interface 240 may be substantially similar to the user interface 220 of FIG. 2B. However, the user interface 240 may include a graphical element 242 that may be populated on the user interface 240 once the user completes the acquisition of the game. The graphical element 242 may include textual information prompting the user or giving the user the option to play a hosted instance of the video game via remote servers (e.g., a cloud server) configured to stream an instance of the game directly to the user's display device and/or gaming platform. For example, the graphic element 242 may inform the user that the game is downloading to the user's gaming platform and include text that may read, "Would you like to stream the game while you wait?" or similar text to indicate to the user that the user has the option to begin playing the game via cloud servers while the data files are downloaded to the user's gaming platform. The user may further be presented with options (e.g., Yes or No) to enable the user to select whether the user would like to play the game via cloud servers or wait for the game to download to the user's gaming platform before beginning to play the game.

Figure 2D:
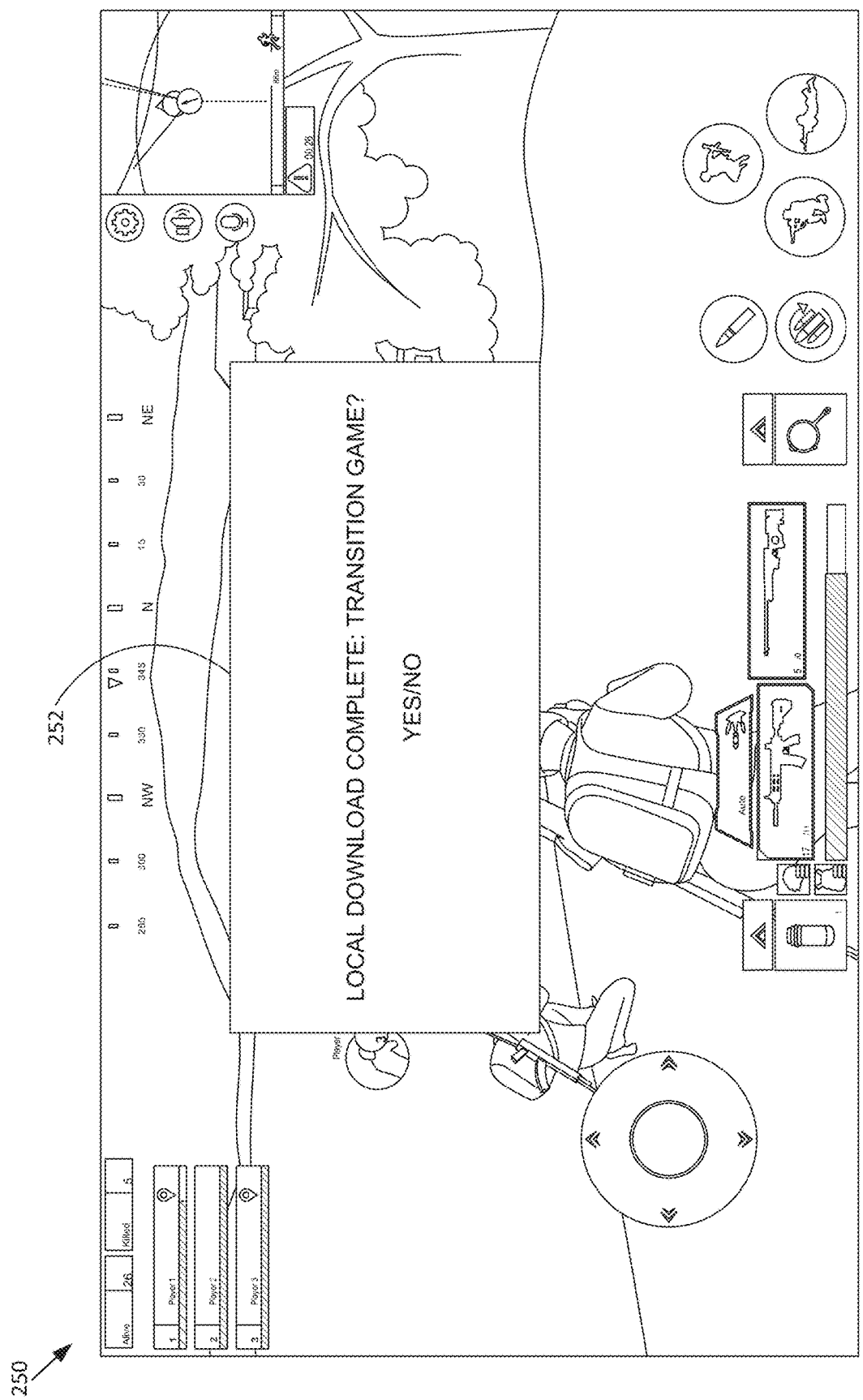
FIG. 2D is an example user interface prompting a user to play a local instance of a game, in accordance with some embodiments of the present disclosure.

Now referring to FIG. 2D, FIG. 2D is an example user interface 250 prompting a user to play a local instance of a game, in accordance with some embodiments of the present disclosure. The example user interface 250 may be substantially similar to the interface presented during game session 130 of FIG. 1. The user interface 250 may include a graphical element 252 that may be populated on the user interface 250 once the download completes to the local gaming platform of the user. The graphical element 252 may include textual information prompting the user or giving the user the option to transition from playing a hosted instance of the acquired video game via remote servers to playing a local instance of the video game directly from the user's gaming platform. For example, the graphic element 252 may inform the user that the data files have completed being downloaded to the user's gaming platform and include text that may read, "Local Download Complete: Transition Game?" or similar text to indicate to the user that the user has the option to begin playing the game via the user's gaming platform. The user may further be presented with options (e.g., Yes or No) to enable the user to select whether the user would like to continue playing the game via cloud servers or begin playing the game via the user's gaming platform.

Figure 3A:
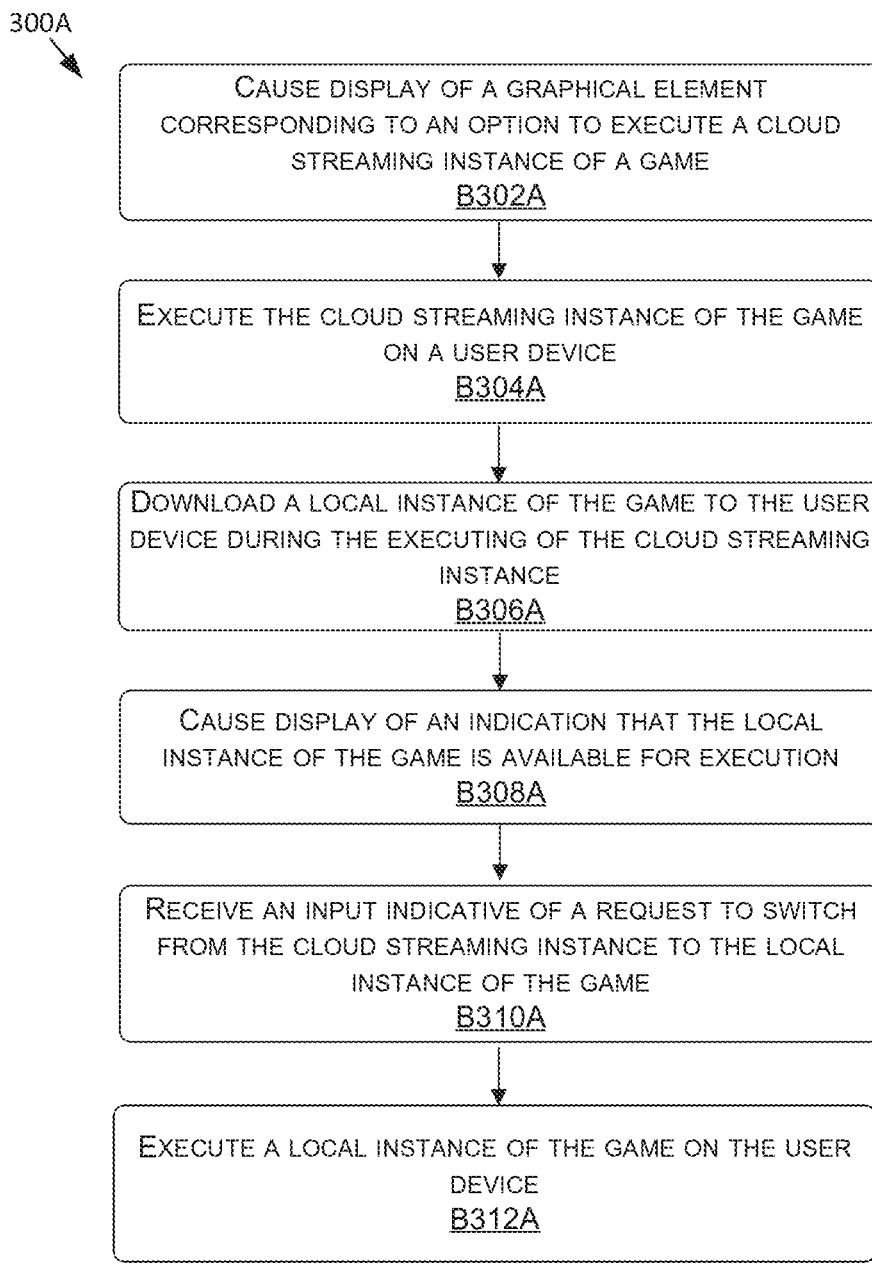
FIG. 3A is a flow diagram showing a method for executing a local instance of a game on a user device based on receiving a request to switch from a cloud streaming instance to a local instance of the game, in accordance with some embodiments of the present disclosure.
Figure 3B:
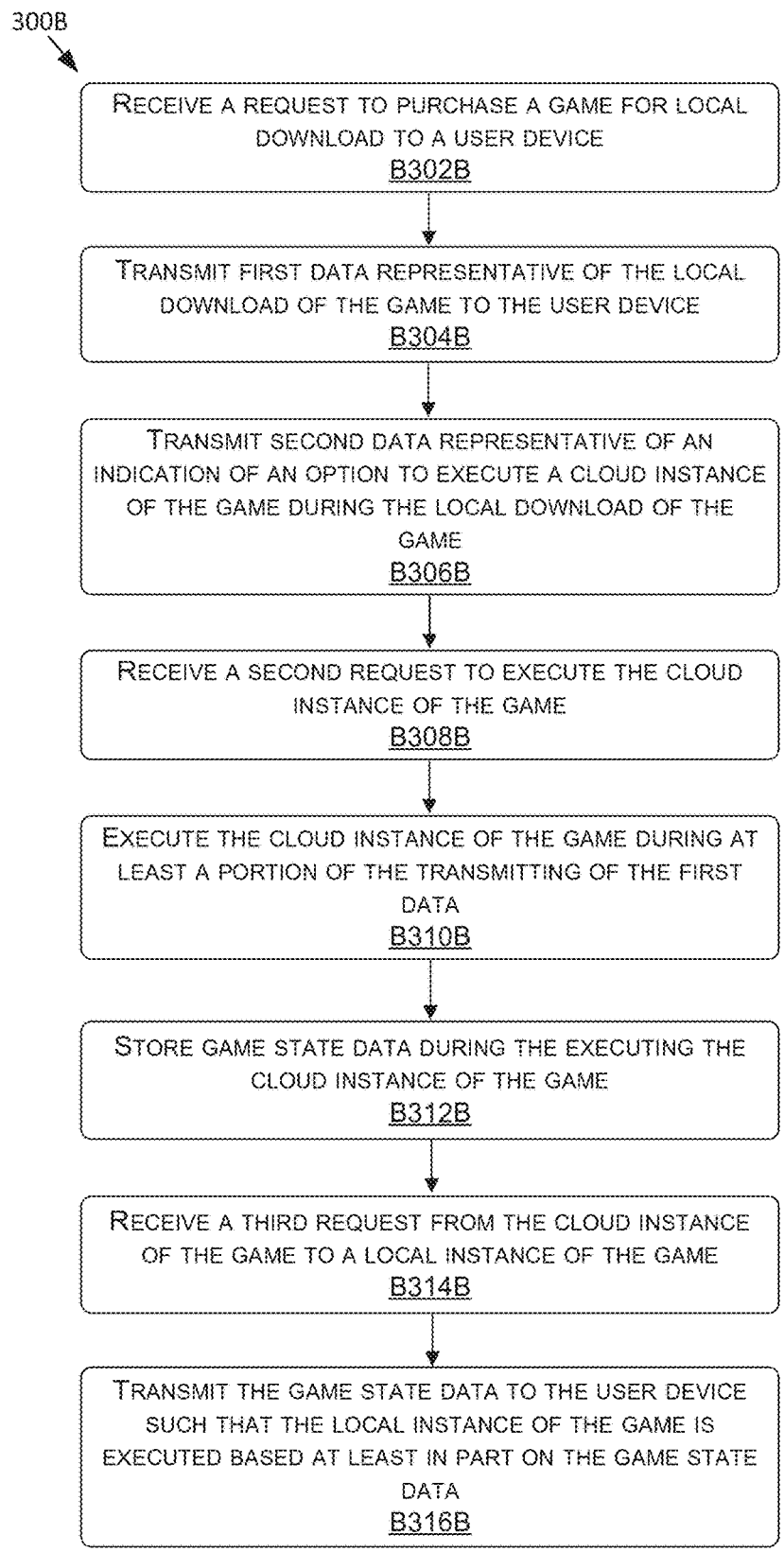
FIG. 3B is a flow diagram showing a method for transmitting game state data to a user device such that a local instance of a game is executed using the game state data, in accordance with some embodiments of the present disclosure.

Now referring to FIGS. 3A-3B, each block of methods 300A and 300B, described herein, comprises a computing process that may be performed using any combination of hardware, firmware, and/or software. For instance, various functions may be carried out by a processor executing instructions stored in memory. The methods 300A and 300B may also be embodied as computer-usable instructions stored on computer storage media. The methods 300A and 300B may be provided by a standalone application, a service or hosted service (standalone or in combination with another hosted service), or a plug-in to another product, to name a few. In addition, methods 300A and 300B are described, by way of example, with respect to the system of FIG. 1. However, this method may additionally or alternatively be executed by any one system, or any combination of systems, including, but not limited to, those described herein.

With reference to FIG. 3A, FIG. 3A is a flow diagram showing a method 200 for executing a local instance of a game on a user device based on receiving a request to switch from a cloud streaming instance to a local instance of the game, in accordance with some embodiments of the present disclosure. The method 300A, at block B302A, includes causing display of a graphical element corresponding to an option to execute a cloud streaming instance of the game on a user device and based at least in part on a game acquisition of a game for local execution on the user device. For example, the user may be prompted or given the option to play a hosted instance of the purchased video game via remote servers (e.g., host server(s) 120) configured to stream an instance of the game directly to the user's gaming platform.

The method 300A, at block B304A, includes launching the cloud streaming instance of the game on the user device based at least in part on a selection of the graphical element. For example, if the user selects to play a hosted instance of the video game via remote servers, the gaming engine 128 may initiate a cloud instance of the game application 106 and begin streaming from the host server(s) 120 to the client device 104.

The method 300A, at block B306A, includes downloading a local instance of the game to the user device during the executing of the cloud streaming instance, the downloading including receiving game state data corresponding to the cloud streaming instance. For example, if the user selects to play a hosted instance of the video game via remote servers, a cloud instance of the video game may begin streaming from game servers in the cloud (e.g., via one or more application programming interfaces (APIs)) while the local instance of the video game downloads to the user's gaming platform in the background. While the user plays the cloud streaming version of the video game, game state data may be tracked, stored, and/or associated with an account of the user—e.g., using an identity management (IDM) system.

The method 300A, at block B308A, includes causing display of an indication that the local instance of the game is available for execution based, at least in part, on the local instance of the game reaching a download point. For example, the user may be prompted to switch to the locally executing instance after a portion (e.g., essential files, beginning levels, popular game modes, etc.) of the game application 106 has been downloaded. As illustrated in FIG. 1, a graphical element 160 may be populated on the display indicating that the local download is complete, prompting the user to transition from the cloud instance to the local instance of the game application 106. Although illustrated as an in-game prompt, this is not intended to be limiting, and in some embodiments the prompt may be at a home screen, at a home setup screen, using another device to communicate the prompt (e.g., a mobile phone), or the like. For example, where transition is not to happen during an active game, the transition may automatically take place after completion of a game session, prior to a new game session, or the like. In other examples, after a game session, before a game session, and/or at another time that is not in-game, the user may be prompted to switch to a locally hosted version of the game application 106.

The method 300A, at block B310A, includes receiving an input indicative of a request to switch from the cloud streaming instance to the local instance of the game. For example, the user may be prompted to switch to the local instance after a portion (e.g., essential files, beginning levels, popular game modes, etc.) of the game application 106 has been downloaded. If the user selects to switch to the local instance of the game application 106, the locally downloaded game application 106 may be launched and a local instance of the game application 106 may be executed on the client device 104.

The method 300A, at block B312A, includes executing the local instance of the game on the user device based at least in part on the request. For example, if the user selects to switch to the local instance of the game application 106, the locally downloaded game application 106 may be launched and a local instance of the game application 106 may be executed on the client device 104.

Now referring to FIG. 3B, FIG. 3B is a flow diagram showing a method 300B for transmitting the game state data to the user device such that the local instance of the game is executed based at least in part on the game state data, in accordance with some embodiments of the present disclosure. The method 300B, at block B302B, includes receiving a first request to purchase, acquire, or otherwise access a game for local download to a user device. For example, a user may access the software library 142 via a digital storefront, which may include a catalog of available games the user may purchase. The user may browse and/or search the catalog and select a game they would like to acquire or access.

The method 300B, at block B304B, includes transmitting, to the user device, first data representative of the local download of the game. For example, upon selection of a game, the user may acquire the game via the digital storefront of the software distribution service 140 and the game may begin downloading to the client device 104 from the software library 142.

The method 300B, at block B306B, includes transmitting, to the user device, second data representative of an indication of an option to execute a cloud instance of the game during the local download of the game. For example, the user may be prompted or given the option to play a hosted instance of the purchased video game via remote servers (e.g., host server(s) 120) configured to stream an instance of the game directly to the user's gaming platform.

The method 300B, at block B308B, includes receiving, from the user device, a second request to execute the cloud-hosted instance of the game. For example, after acquisition of a game, the user may select to play the game via a cloud-hosted instance of the game while the data files are downloaded to the local device.

The method 300B, at block B310B, includes executing the cloud-hosted instance of the game during at least a portion of the transmitting of the first data. For example, if the user selects to play a hosted instance of the video game via remote servers, a cloud-hosted instance of the video game may begin streaming from game servers in the cloud (e.g., via one or more application programming interfaces (APIs)) while the data files of the video game are downloaded to the user's local gaming platform in the background.

The method 300B, at block B312B, includes storing, during the executing the cloud-hosted instance of the game, game state data. For example, while the user plays the cloud streaming version of the video game, game state data may be tracked, stored, and/or associated with an account of the user—e.g., using an identity management (IDM) system.

The method 300B, at block B314B, includes receiving a third request from the user device to transfer the cloud instance of the game to a local instance of the game. For example, the user may be prompted to switch to the local instance of the game after a portion (e.g., essential files, beginning levels, popular game modes, etc.) of the game application 106 has been downloaded. The user may then select to transfer to the local instance of the game and so that the user may resume playing the game on the user's local device.

The method 300B, at block B316B, includes transmitting the game state data to the user device such that the local instance of the game is executed based at least in part on the game state. For example, the game state information, or a substantial portion thereof, may be downloaded at a substantially similar time as the local instance of the video game. The user may then begin playing the local instance of the video game at the same point in the game where the user left off in the hosted instance of the video game, with both global and instance game state information accounted for.

Although various examples are described herein with respect to video games and first person shooter (FPS) type games in particular, this is not intended to be limiting and may apply to various competitive and/or cooperative games, and eSports games that can include, without limitation, racing, sports simulation, real-time strategy, collectible card game simulations, massively multiplayer online games, platform games, etc. For example, the game state data may include, for a sports simulation game, locations of players on the field or court at each point in time, locations of the sports ball at each point in time, the score, the stamina or energy of the players, etc. As another example, the game state data may include, for a strategy game (e.g., a real-time strategy game), locations of pieces on a board or map or within an environment, hit points for different objects in the environment (e.g., a gun turret, a castle, a barrier, etc.), days until maturity for crops, etc. Embodiments are also not limited to video games and gaming applications. Other suitable embodiments include applications that would benefit from higher compute capabilities or virtualization presented by cloud computing environments and data centers. These applications may include, without limitation, graphical content creation or design applications (e.g., 3D modeling and CAD applications), simulation, video processing or encoding, and deep learning (e.g., training and/or ground truth generation) applications.

Example Data Streaming System

Figure 4:
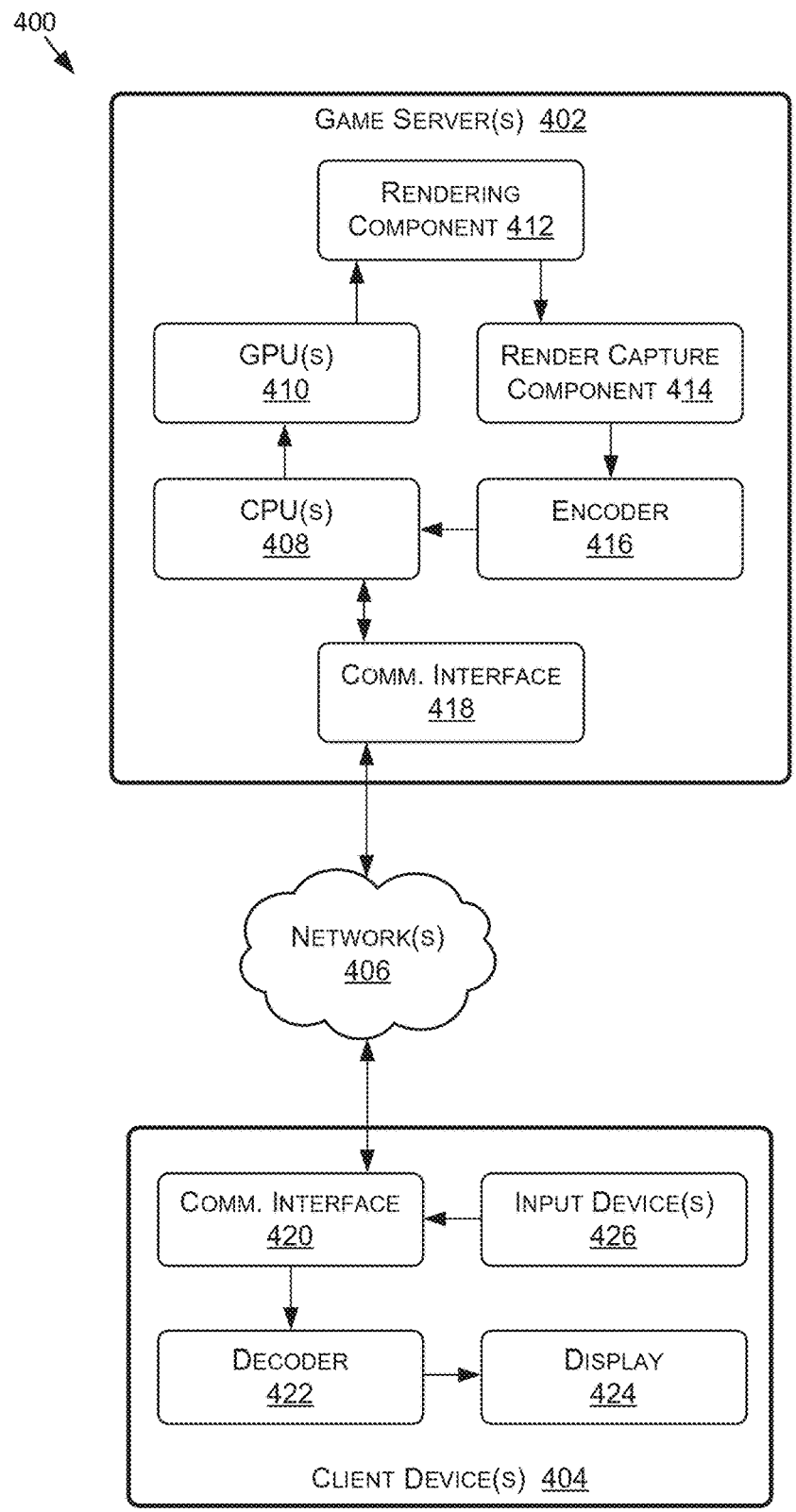
FIG. 4 is a block diagram of an example game streaming system suitable for use in implementing some embodiments of the present disclosure.

Now referring to FIG. 4, FIG. 4 is an example system diagram for a data streaming system 400, in accordance with some embodiments of the present disclosure. FIG. 4 includes data server(s) 402 (which may include similar components, features, and/or functionality to the example computing device 500 of FIG. 5), client device(s) 404 (which may include similar components, features, and/or functionality to the example computing device 500 of FIG. 5), and network(s) 406 (which may be similar to the network(s) described herein). In some embodiments of the present disclosure, the system 400 may be implemented.

In the system 400, for an application session, the client device(s) 404 may only receive input data in response to inputs to the input device(s), transmit the input data to the data server(s) 402, receive encoded display data from the data server(s) 402, and display the display data on the display 424. As such, the more computationally intense computing and processing is offloaded to the data server(s) 402 (e.g., rendering—in particular ray or path tracing—for graphical output of the application session is executed by the GPU(s) of the data server(s) 402). In other words, the application session is streamed to the client device(s) 404 from the data server(s) 402, thereby reducing the requirements of the client device(s) 404 for graphics processing and rendering.

For example, with respect to an instantiation of an application session, a client device 404 may be displaying a frame of the application session on the display 424 based on receiving the display data from the data server(s) 402. The client device 404 may receive an input to one of the input device(s) and generate input data in response. The client device 404 may transmit the input data to the data server(s) 402 via the communication interface 420 and over the network(s) 406 (e.g., the Internet), and the data server(s) 402 may receive the input data via the communication interface 418. The CPU(s) may receive the input data, process the input data, and transmit data to the GPU(s) that causes the GPU(s) to generate a rendering of, or provide computation for the application session. For example, the input data may be representative of a movement or behavior of a character or objects in a game, or simulations thereof, etc. The rendering component 412 may render the application session (e.g., representative of the result of the input data) and the render capture component 414 may capture the rendering of the application session as display data (e.g., as image data capturing the rendered frame of the application session). The rendering of the application session may include ray or path-traced lighting and/or shadow effects, computed using one or more parallel processing units—such as GPUs, which may further employ the use of one or more dedicated hardware accelerators or processing cores to perform ray or path-tracing techniques—of the data server(s) 402. In some embodiments, the data server(s) 402 may use one or more virtual machines (VMs) to render or perform other operations for the application session. For example, the data server(s) 402 may include one or more virtual GPUs (vGPUs), virtual CPUs (vCPUs), and/or other virtual components of a VM(s) for use in executing the application session. The encoder 416 may then encode the display data to generate encoded display data and the encoded display data may be transmitted to the client device 404 over the network(s) 406 via the communication interface 418. The client device 404 may receive the encoded display data via the communication interface 420 and the decoder 422 may decode the encoded display data to generate the display data. The client device 404 may then display the display data via the display 424.

Example Computing Device

Figure 5:
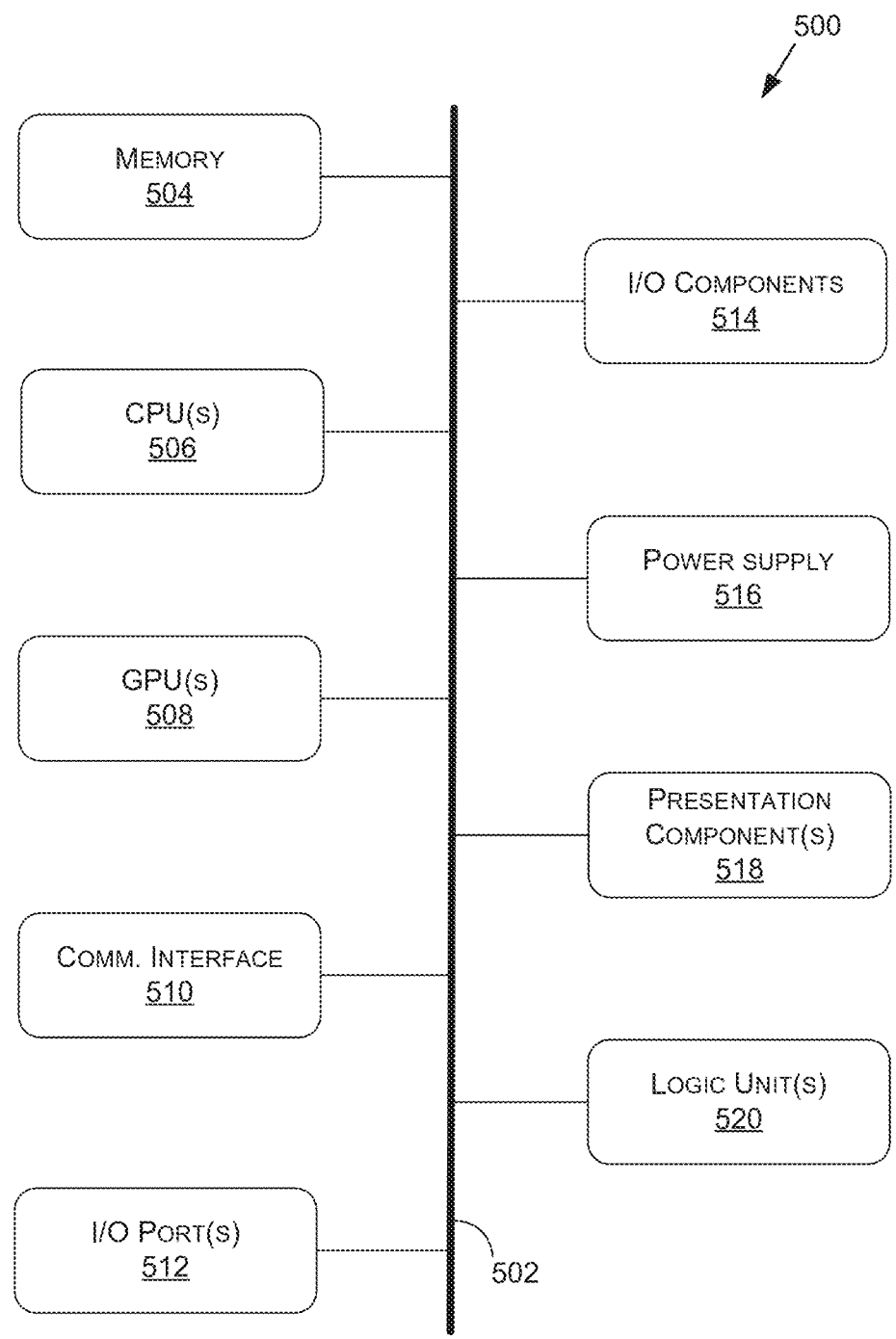
FIG. 5 is a block diagram of an example computing device suitable for use in implementing some embodiments of the present disclosure.

FIG. 5 is a block diagram of an example computing device(s) 500 suitable for use in implementing some embodiments of the present disclosure. Computing device 500 may include an interconnect system 502 that directly or indirectly couples the following devices: memory 504, one or more central processing units (CPUs) 506, one or more graphics processing units (GPUs) 508, a communication interface 510, input/output (I/O) ports 512, input/output components 514, a power supply 516, one or more presentation components 518 (e.g., display(s)), and one or more logic units 520. In at least one embodiment, the computing device(s) 500 may comprise one or more virtual machines (VMs), and/or any of the components thereof may comprise virtual components (e.g., virtual hardware components). For example, one or more of the GPUs 508 may comprise one or more vGPUs, one or more of the CPUs 506 may comprise one or more vCPUs, and/or one or more of the logic units 520 may comprise one or more virtual logic units.

Although the various blocks of FIG. 5 are shown as connected via the interconnect system 502 with lines, this is not intended to be limiting and is for clarity only. For example, in some embodiments, a presentation component 518, such as a display device, may be considered an I/O component 514 (e.g., if the display is a touch screen). As another example, the CPUs 506 and/or GPUs 508 may include memory (e.g., the memory 504 may be representative of a storage device in addition to the memory of the GPUs 508, the CPUs 506, and/or other components). In other words, the computing device of FIG. 5 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5.

The interconnect system 502 may represent one or more links or busses, such as an address bus, a data bus, a control bus, or a combination thereof. The interconnect system 502 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 506 may be directly connected to the memory 504. Further, the CPU 506 may be directly connected to the GPU 508. Where there is direct, or point-to-point connection between components, the interconnect system 502 may include a PCIe link to carry out the connection. In these examples, a PCI bus need not be included in the computing device 500.

The memory 504 may include any of a variety of computer-readable media. The computer-readable media may be any available media that may be accessed by the computing device 500. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 504 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 500. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 506 may be configured to execute at least some of the computer-readable instructions to control one or more components of the computing device 500 to perform one or more of the methods and/or processes described herein. The CPU(s) 506 may each include one or more cores (e.g., one, two, four, eight, twenty-eight, seventy-two, etc.) that are capable of handling a multitude of software threads simultaneously. The CPU(s) 506 may include any type of processor, and may include different types of processors depending on the type of computing device 500 implemented (e.g., processors with fewer cores for mobile devices and processors with more cores for servers). For example, depending on the type of computing device 500, the processor may be an Advanced RISC Machines (ARM) processor implemented using Reduced Instruction Set Computing (RISC) or an x86 processor implemented using Complex Instruction Set Computing (CISC). The computing device 500 may include one or more CPUs 506 in addition to one or more microprocessors or supplementary co-processors, such as math co-processors.

In addition to or alternatively from the CPU(s) 506, the GPU(s) 508 may be configured to execute at least some of the computer-readable instructions to control one or more components of the computing device 500 to perform one or more of the methods and/or processes described herein. One or more of the GPU(s) 508 may be an integrated GPU (e.g., with one or more of the CPU(s) 506 and/or one or more of the GPU(s) 508 may be a discrete GPU. In embodiments, one or more of the GPU(s) 508 may be a coprocessor of one or more of the CPU(s) 506. The GPU(s) 508 may be used by the computing device 500 to render graphics (e.g., 3D graphics) or perform general purpose computations. For example, the GPU(s) 508 may be used for General-Purpose computing on GPUs (GPGPU). The GPU(s) 508 may include hundreds or thousands of cores that are capable of handling hundreds or thousands of software threads simultaneously. The GPU(s) 508 may generate pixel data for output images in response to rendering commands (e.g., rendering commands from the CPU(s) 506 received via a host interface). The GPU(s) 508 may include graphics memory, such as display memory, for storing pixel data or any other suitable data, such as GPGPU data. The display memory may be included as part of the memory 504. The GPU(s) 508 may include two or more GPUs operating in parallel (e.g., via a link). The link may directly connect the GPUs (e.g., using NVLINK) or may connect the GPUs through a switch (e.g., using NVSwitch). When combined together, each GPU 508 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 506 and/or the GPU(s) 508, the logic unit(s) 520 may be configured to execute at least some of the computer-readable instructions to control one or more components of the computing device 500 to perform one or more of the methods and/or processes described herein. In embodiments, the CPU(s) 506, the GPU(s) 508, and/or the logic unit(s) 520 may discretely or jointly perform any combination of the methods, processes and/or portions thereof. One or more of the logic units 520 may be part of and/or integrated in one or more of the CPU(s) 506 and/or the GPU(s) 508 and/or one or more of the logic units 520 may be discrete components or otherwise external to the CPU(s) 506 and/or the GPU(s) 508. In embodiments, one or more of the logic units 520 may be a coprocessor of one or more of the CPU(s) 506 and/or one or more of the GPU(s) 508.

Examples of the logic unit(s) 520 include one or more processing cores and/or components thereof, such as Tensor Cores (TCs), Tensor Processing Units(TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 510 may include one or more receivers, transmitters, and/or transceivers that enable the computing device 500 to communicate with other computing devices via an electronic communication network, included wired and/or wireless communications. The communication interface 510 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 512 may enable the computing device 500 to be logically coupled to other devices including the I/O components 514, the presentation component(s) 518, and/or other components, some of which may be built in to (e.g., integrated in) the computing device 500. Illustrative I/O components 514 include a microphone, mouse, keyboard, joystick, game pad, game controller, satellite dish, scanner, printer, wireless device, etc. The I/O components 514 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 500. The computing device 500 may be include depth cameras, such as stereoscopic camera systems, infrared camera systems, RGB camera systems, touchscreen technology, and combinations of these, for gesture detection and recognition. Additionally, the computing device 500 may include accelerometers or gyroscopes (e.g., as part of an inertia measurement unit (IMU)) that enable detection of motion. In some examples, the output of the accelerometers or gyroscopes may be used by the computing device 500 to render immersive augmented reality or virtual reality.

The power supply 516 may include a hard-wired power supply, a battery power supply, or a combination thereof. The power supply 516 may provide power to the computing device 500 to enable the components of the computing device 500 to operate.

The presentation component(s) 518 may include a display (e.g., a monitor, a touch screen, a television screen, a heads-up-display (HUD), other display types, or a combination thereof), speakers, and/or other presentation components. The presentation component(s) 518 may receive data from other components (e.g., the GPU(s) 508, the CPU(s) 506, etc.), and output the data (e.g., as an image, video, sound, etc.).

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 500 of FIG. 5—e.g., each device may include similar components, features, and/or functionality of the computing device(s) 500.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 500 described herein with respect to FIG. 5. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Example Data Center

Figure 6:
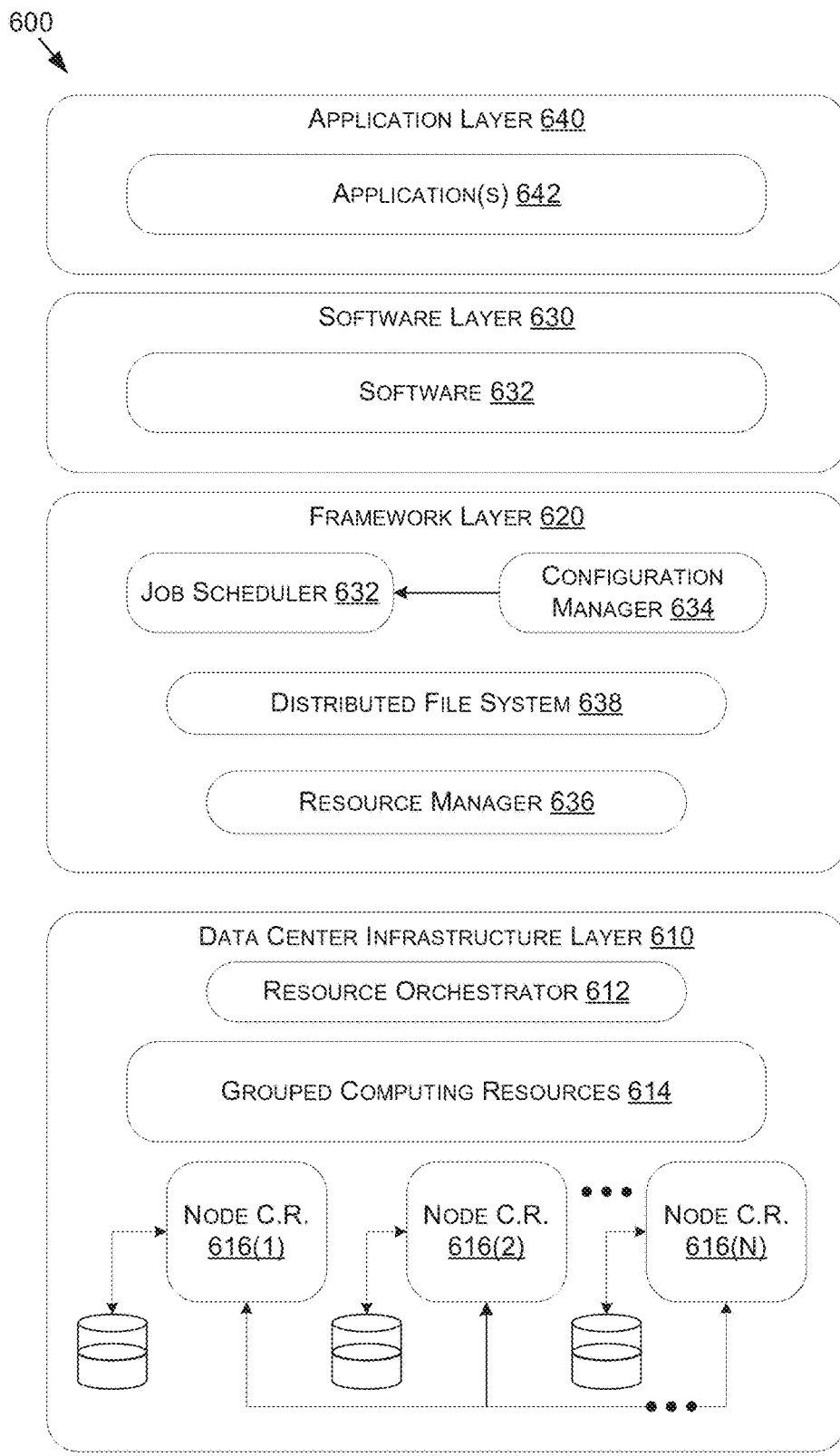
FIG. 6 is a block diagram of an example data center suitable for use in implementing some embodiments of the present disclosure.

FIG. 6 illustrates an example data center 600 that may be used in at least one embodiments of the present disclosure. The data center 600 may include a data center infrastructure layer 610, a framework layer 620, a software layer 630, and/or an application layer 640.

As shown in FIG. 6, the data center infrastructure layer 610 may include a resource orchestrator 612, grouped computing resources 614, and node computing resources ("node C.R.s") 616(1)-616(N), where "N" represents any whole, positive integer. In at least one embodiment, node C.R.s 616(1)-616(N) may include, but are not limited to, any number of central processing units ("CPUs") or other processors (including accelerators, field programmable gate arrays (FPGAs), graphics processors or graphics processing units (GPUs), etc.), memory devices (e.g., dynamic read-only memory), storage devices (e.g., solid state or disk drives), network input/output ("NW I/O") devices, network switches, virtual machines ("VMs"), power modules, and/or cooling modules, etc. In some embodiments, one or more node C.R.s from among node C.R.s 616(1)-616(N) may correspond to a server having one or more of the above-mentioned computing resources. In addition, in some embodiments, the node C.R.s 616(1)-6161(N) may include one or more virtual components, such as vGPUs, vCPUs, and/or the like, and/or one or more of the node C.R.s 616(1)-616(N) may correspond to a virtual machine (VM).

In at least one embodiment, grouped computing resources 614 may include separate groupings of node C.R.s 616 housed within one or more racks (not shown), or many racks housed in data centers at various geographical locations (also not shown). Separate groupings of node C.R.s 616 within grouped computing resources 614 may include grouped compute, network, memory or storage resources that may be configured or allocated to support one or more workloads. In at least one embodiment, several node C.R.s 616 including CPUs, GPUs, and/or other processors may be grouped within one or more racks to provide compute resources to support one or more workloads. The one or more racks may also include any number of power modules, cooling modules, and/or network switches, in any combination.

The resource orchestrator 622 may configure or otherwise control one or more node C.R.s 616(1)-616(N) and/or grouped computing resources 614. In at least one embodiment, resource orchestrator 622 may include a software design infrastructure ("SDI") management entity for the data center 600. The resource orchestrator 622 may include hardware, software, or some combination thereof.

In at least one embodiment, as shown in FIG. 6, framework layer 620 may include a job scheduler 632, a configuration manager 634, a resource manager 636, and/or a distributed file system 638. The framework layer 620 may include a framework to support software 632 of software layer 630 and/or one or more application(s) 642 of application layer 640. The software 632 or application(s) 642 may respectively include web-based service software or applications, such as those provided by Amazon Web Services, Google Cloud and Microsoft Azure. The framework layer 620 may be, but is not limited to, a type of free and open-source software web application framework such as Apache Spark™ (hereinafter "Spark") that may utilize distributed file system 638 for large-scale data processing (e.g., "big data"). In at least one embodiment, job scheduler 632 may include a Spark driver to facilitate scheduling of workloads supported by various layers of data center 600. The configuration manager 634 may be capable of configuring different layers such as software layer 630 and framework layer 620 including Spark and distributed file system 638 for supporting large-scale data processing. The resource manager 636 may be capable of managing clustered or grouped computing resources mapped to or allocated for support of distributed file system 638 and job scheduler 632. In at least one embodiment, clustered or grouped computing resources may include grouped computing resource 614 at data center infrastructure layer 610. The resource manager 1036 may coordinate with resource orchestrator 612 to manage these mapped or allocated computing resources.

In at least one embodiment, software 632 included in software layer 630 may include software used by at least portions of node C.R.s 616(1)-616(N), grouped computing resources 614, and/or distributed file system 638 of framework layer 620. One or more types of software may include, but are not limited to, Internet web page search software, e-mail virus scan software, database software, and streaming video content software.

In at least one embodiment, application(s) 642 included in application layer 640 may include one or more types of applications used by at least portions of node C.R.s 616(1)-616(N), grouped computing resources 614, and/or distributed file system 638 of framework layer 620. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 634, resource manager 636, and resource orchestrator 612 may implement any number and type of self-modifying actions based on any amount and type of data acquired in any technically feasible fashion. Self-modifying actions may relieve a data center operator of data center 600 from making possibly bad configuration decisions and possibly avoiding underutilized and/or poor performing portions of a data center.

The data center 600 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 600. In at least one embodiment, trained or deployed machine learning models corresponding to one or more neural networks may be used to infer or predict information using resources described above with respect to the data center 600 by using weight parameters calculated through one or more training techniques, such as but not limited to those described herein.

In at least one embodiment, the data center 600 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   causing display of a graphical element using a user device, the graphical element corresponding to an option to execute a cloud-hosted instance of an application;
   based at least on a selection of the graphical element, streaming data generated using the cloud-hosted instance to the user device to cause presentation of graphical content corresponding to the streaming data on a display of the user device;
   causing a download of data files of the application to be transferred to the user device during the presentation of the graphical content corresponding to the streaming data on the display of the user device, the download further including application state data corresponding to the cloud-hosted instance;
   based at least on the download of the data files reaching a download threshold, causing display of an indication that a local instance of the application is available for local execution;
   based at least on the download of the data files reaching the download threshold, receiving a request to switch the presentation from the graphical content corresponding to the streaming data to graphical content generated using the local instance of the application; and
   responsive to the request to switch the presentation, launching the local instance of the application using the user device, at least a portion of the data files, and the application state data to generate the graphical content using the local instance of the application.

2. The method of claim 1, wherein the data files include an executable file of the application.

3. The method of claim 1, wherein the indication includes an option that is selectable to generate the request, cause the launching of the local instance, and cause the presentation of the graphical content corresponding to the application generated using the local instance on the user device.

4. The method of claim 1, wherein the application state data is representative of at least one of:
   application progress, application achievements, application states, saved applications, in-application changes, inventory, application settings, or client device settings.

5. The method of claim 1, wherein the presentation of the graphical content corresponding to the streaming data includes interactive gameplay of the application.

6. The method of claim 1, wherein the download threshold corresponds to completion of a full download of the application to the user device.

7. The method of claim 1, wherein the application state data captures a point in the application reached during the presentation of the graphical content corresponding to the streaming data on the user device and the launching uses the application state data to resume the local instance from the point.

8. The method of claim 1, wherein the receiving the application state data is from an identity management (IDM) server that stores the application state data during the presentation of the graphical content corresponding to the streaming data on the display of the user device.

9. The method of claim 1, further comprising:
   storing additional application state data during executing of the local instance of the application on the user device; and
   transmitting the additional application state data to a host device hosting another cloud-hosted instance of the application, wherein the additional application state data is used during executing of the another cloud-hosted instance of the application on another user device.

10. A method comprising:
    receiving a first request to download data files of a local instance of an application to a user device;
    transmitting, to the user device, an indication of an option to execute a cloud-hosted instance of the application during the download of the data files of the local instance of the application to the user device;
    executing the cloud-hosted instance of the application to cause a streaming presentation of the cloud-hosted instance on the user device during the download of the data files of the local instance of the application to the user device based at least on a selection of the option;
    based at least on the download of the data files reaching a download threshold, receiving a second request from the user device to switch execution of the application from the cloud-hosted instance of the application to the local instance of the application; and
    transmitting application state data corresponding to the cloud-hosted instance of the application to the user device such that, responsive to the second request, the local instance of the application is executed using the user device, at least a portion of the data files, and the application state data.

11. The method of claim 10, wherein the executing the cloud-hosted instance is initiated via an application programming interface (API) of a cloud application host device.

12. The method of claim 10, wherein the second request is received based at least on a download point of the download being reached by the user device, and the download point is prior to completion of the download by the user device.

13. The method of claim 10, wherein the switch of the execution causes the local instance to initiate rendering of the application on the user device and causes the user device to switch from displaying first output of the cloud-hosted instance rendering the application on a cloud device to second output of the rendering of the application on the user device.

14. A system comprising:
one or more processors to execute operations comprising:
executing a cloud-hosted instance of an application using a user device;
transferring a download of data files of a local instance of the application to the user device during a streaming presentation of the cloud-hosted instance on the user device;
based at least on the download of the data files of the local instance of the application reaching a download threshold, receiving a request to switch execution of the application from the cloud-hosted instance of the application to the local instance of the application; and
responsive to the request to switch the execution, launching the local instance of the application using the user device, at least a portion of the data files, and application state data associated with the presentation of the cloud-hosted instance on the user device.

15. The system of claim 14, wherein the executing the cloud-hosted instance is initiated via an application programming interface (API) of a cloud application host device.

16. The system of claim 14, further comprising storing the application state data using an identify management (IDM) server.

17. The system of claim 14, wherein the data files represent a full version of the application.

18. The system of claim 14, wherein the application state data captures persistent user progress made in the application during the presentation of the cloud-hosted instance on the user device.

19. The system of claim 14, wherein the application state data is representative of global information corresponding to a plurality of instances of the application and instance information corresponding to the cloud-hosted instance of the application.

20. The system of claim 14, wherein the download threshold corresponds to at least one of an entirety of the local instance of the application being downloaded on the user device or a portion of the local instance of the application being downloaded on the user device.

* * * * *